(12) United States Patent
Watanabe et al.

(10) Patent No.: US 7,715,946 B2
(45) Date of Patent: May 11, 2010

(54) INDUSTRIAL ROBOT

(75) Inventors: Atsushi Watanabe, Tokyo (JP); Ryo Nihei, Yamanashi (JP); Toshihiko Inoue, Yamanashi (JP)

(73) Assignee: Fanuc Ltd, Minamitsuru-gun, Yamanashi (JP)

( * ) Notice: Subject to any disclaimer, the term of this patent is extended or adjusted under 35 U.S.C. 154(b) by 1594 days.

(21) Appl. No.: 10/976,049

(22) Filed: Oct. 29, 2004

(65) Prior Publication Data

US 2005/0096792 A1    May 5, 2005

(30) Foreign Application Priority Data

Oct. 31, 2003    (JP) .............................. 2003-372182

(51) Int. Cl.
*G06F 19/00*    (2006.01)
(52) U.S. Cl. ..................... 700/245; 700/248; 700/251; 700/259; 700/262; 700/264; 219/125.1; 219/124.34; 219/121.85
(58) Field of Classification Search ................ 700/245, 700/248, 251, 259, 262, 264; 219/125.1, 219/124.34, 121.85, 121.71, 121.68
See application file for complete search history.

(56) References Cited

U.S. PATENT DOCUMENTS

| | | | | |
|---|---|---|---|---|
| 4,675,502 A | * | 6/1987 | Haefner et al. | ......... 219/124.34 |
| 4,727,471 A | * | 2/1988 | Driels et al. | ................... 700/66 |
| 4,960,040 A | * | 10/1990 | Kamagai et al. | .............. 92/261 |
| 5,148,591 A | * | 9/1992 | Pryor | ...................... 29/407.04 |
| 5,400,638 A | * | 3/1995 | Kim | ............................ 73/1.79 |
| 5,515,599 A | * | 5/1996 | Best | ............................. 29/705 |
| 5,572,103 A | * | 11/1996 | Terada | .................... 318/568.13 |
| 5,608,847 A | * | 3/1997 | Pryor | ......................... 700/248 |

(Continued)

FOREIGN PATENT DOCUMENTS

GB    2 110 427 A    6/1983

(Continued)

OTHER PUBLICATIONS

Roger Y. Tsai et al., "A new Technique for Fully Autonomous and Efficient 3D Robotics Hand/Eye Calibration", IEEE Transactions on Robotics and Automation, vol. 5, No. 3, Jun. 1989, pp. 345-358.

*Primary Examiner*—Thomas G Black
*Assistant Examiner*—Wae Louie
(74) *Attorney, Agent, or Firm*—Drinker Biddle & Reath LLP

(57) ABSTRACT

An industrial robot, having an end-effector supporting mechanism for holding an end-effector and accommodating an imaging device of a visual sensor, which is free from the interference with the periphery and capable of taking an image of the working position. A container-shaped adaptor of the end-effector supporting mechanism is attached to a distal end of a wrist flange provided in a robot wrist supported by a robot arm. The adaptor has a first attachment section provided with a first attachment surface to be attached to the wrist flange, and a second attachment section provided with a second attachment surface disposed generally parallel to a wrist flange surface at a position apart from the first attachment section by a predetermined distance along a rotary center axis of the wrist flange. On the second attachment surface, a tool holding member of the end-effector supporting mechanism for holding the working tool is attached.

11 Claims, 8 Drawing Sheets

U.S. PATENT DOCUMENTS

| | | | |
|---|---|---|---|
| 5,617,515 A * | 4/1997 | MacLaren et al. | 700/264 |
| 5,737,500 A * | 4/1998 | Seraji et al. | 700/251 |
| 5,777,267 A * | 7/1998 | Szydel | 174/72 A |
| 5,841,104 A * | 11/1998 | Svensson | 219/125.1 |
| 5,957,933 A * | 9/1999 | Yanof et al. | 606/130 |
| 6,160,905 A * | 12/2000 | Ahn et al. | 382/141 |
| 6,163,946 A * | 12/2000 | Pryor | 29/407.04 |
| 6,321,137 B1 * | 11/2001 | De Smet | 700/245 |
| 6,369,353 B1 * | 4/2002 | Soska | 219/121.68 |
| 6,408,224 B1 * | 6/2002 | Okamoto et al. | 700/245 |
| 6,529,852 B2 * | 3/2003 | Knoll et al. | 702/150 |
| 6,535,794 B1 * | 3/2003 | Raab | 700/262 |
| 6,587,752 B1 * | 7/2003 | Saito | 700/264 |
| 6,597,971 B2 * | 7/2003 | Kanno | 700/245 |
| 6,696,668 B2 * | 2/2004 | Hayakawa | 219/121.85 |
| 6,816,755 B2 * | 11/2004 | Habibi et al. | 700/259 |
| 6,826,452 B1 * | 11/2004 | Holland et al. | 700/245 |
| 6,889,119 B2 * | 5/2005 | Riff et al. | 700/254 |
| 6,977,356 B2 * | 12/2005 | Vaidyanathan et al. | 219/121.71 |
| 7,218,995 B2 * | 5/2007 | Jahn et al. | 700/259 |
| 2001/0054637 A1 * | 12/2001 | Hayakawa | 228/102 |
| 2001/0056313 A1 * | 12/2001 | Osborne, Jr. | 700/245 |
| 2002/0169522 A1 * | 11/2002 | Kanno | 700/245 |
| 2003/0144765 A1 * | 7/2003 | Habibi et al. | 700/259 |
| 2004/0172164 A1 * | 9/2004 | Habibi et al. | 700/245 |
| 2004/0199288 A1 * | 10/2004 | Watanabe et al. | 700/245 |
| 2004/0243282 A1 * | 12/2004 | Watanabe et al. | 700/259 |
| 2005/0071048 A1 * | 3/2005 | Watanabe et al. | 700/259 |
| 2005/0096792 A1 * | 5/2005 | Watanabe et al. | 700/245 |
| 2005/0273199 A1 * | 12/2005 | Ban et al. | 700/248 |

FOREIGN PATENT DOCUMENTS

| | | |
|---|---|---|
| JP | 63-251182 | 10/1988 |
| JP | 1-182705 | 7/1989 |
| JP | 04-013530 | 1/1992 |
| JP | 08/019987 | 1/1996 |
| JP | 09-070786 | 3/1997 |
| JP | 10-128538 | 5/1998 |

* cited by examiner

INDUSTRIAL ROBOT

BACKGROUND ART

1. Technical Field

The preset invention relates to an industrial robot and, more specifically, to an industrial robot provided with an imaging device of a visual sensor for detecting a working tool and a working position.

2. Description of the Related Art

In an industrial robot (hereinafter referred to simply as a robot), there are many cases wherein an imaging device of a visual sensor is mounted for detecting a working tool and a working position (for example, a digital CCD camera). For example, when a robot program is made on off-line, there is usually an error between an actual operation path for this program and a desired operation path, and for the purpose of correcting the same, a method for mounting an imaging device of a visual sensor for detecting the working position in the vicinity of the working tool and correcting a teaching point by using detected data obtained through the imaging device (for example, see Japanese Unexamined Patent Publication No. 10-128538).

When the visual sensor is actually supported in the vicinity of the operative tool, however, it is liable to interfere with a workpiece or others because it has a considerable size in the vertical and horizontal directions. Accordingly, it is difficult to obtain the same operation path during the actual operation (for example, welding), whereby there has been a limitation in an applicable program. Also, a conventional sensor supporting structure (a structure for supporting an imaging device) may interfere with a part of a body of the robot on a side of a torch cable for supporting a welding cable or assist gas to an arc-welding torch.

In a more concrete prior art, an imaging device and a working tool holding member are attached by well-known attachment means (not shown) using adhesive, screws or others to a distal end of a wrist flange supported by a robot arm. The working tool supported by the working tool holding member is, for example, an arc welding torch (hereinafter merely referred to as a torch) used for corner welding or other work. When the corner welding is carried out in a narrow and complicated portion of a workpiece, part of the imaging device (particularly, a distal end portion) may approach the workpiece and interfere therewith. Further, interference between the torch and the body of the robot may occur.

To avoid such interference, in the above-mentioned prior art, a different structure of the working tool is used in the production from that used in the teaching, or the imaging device is removed if necessary. Such a countermeasure, however, is problematic in that the teaching cannot be corrected as in the production. Alternatively, the working tool may be of a detachable type to allow the working tool to be detached from the distal end of the wrist and, instead, the imaging device of the visual sensor is mounted thereto so that the interference with the peripheral equipment is temporarily eliminated. In the latter case, there is another problem caused by the attachment error of the working tool or in that it is impossible during the teaching to correct the deviation of the welded position due to the change of wire bending due to a posture of the robot (see FIG. 4 and the explanation thereof described later).

In this regard, relating to the embodiments of the present invention described later, IEEE TRANSACTIONS ON ROBOTICS AND AUTOMATION (Vol. 5, No. 3, June 1989) "A New Technique for Fully Autonomous and Efficient 3D Robotics Hand/Eye calibration" is cited as a prior art.

SUMMARY OF THE INVENTION

The present invention provides an industrial robot having a simple structure capable of solving the above-mentioned problems in the prior art, that is, it hardly interferes with the periphery even if the working tool and the imaging device of the visual sensor are mounted on the robot, and can take, without any trouble, an image of a portion to be processed by the working tool.

According to the present invention, an industrial robot is provided, comprising a robot arm provided with a rotatable wrist flange, an end-effector positioned at a predetermined working position by the robot arm, an end-effector supporting mechanism attached to the wrist flange in the robot arm, for supporting the end-effector, an imaging device for detecting the end-effector and the working position, and holding means for detachably holding the imaging device so that a center of gravity of the imaging device is located at a position within the end-effector supporting mechanism.

The end-effector supporting mechanism comprises an adaptor for accommodating the imaging device in the interior thereof and an end-effector holding member attached to the adaptor, for holding the end-effector, and the adaptor is provided with a first attachment section for attaching the adaptor to a wrist flange surface of the wrist flange and a second attachment section having an attachment surface generally parallel to the wrist flange surface at a position apart from the first attachment section by a predetermined distance along a rotary center axis of the wrist flange, wherein the imaging device is capable of being held so that a center of gravity of the imaging device is positioned between the first attachment section and the second attachment section.

Alternatively, the adaptor and the end-effector holding member may be integral with each other, and the imaging device is held so that a center of gravity of the imaging device is positioned within the interior of the adaptor.

The imaging device and the end-effector are attachable so that part of the end-effector comes into a visual field of the imaging device.

The rotary center axis of the wrist flange and a center line of the visual field of the imaging device can generally coincide with each other.

The industrial robot may have a mechanism capable of regenerating every time the same attachment position and posture of the imaging device relative to the end-effector supporting mechanism.

The wrist flange may be provided with a through-hole for allowing a cable for the imaging device to pass therethrough. Further, an imaging device side connector for supplying electric power to the imaging device and transmitting signals and a wrist flange side connector electrically connectable to the imaging device side connector may be disposed in the through-hole.

Radio-communication means may be used instead of outputting signals from the imaging device through a lead.

The industrial robot may have a protective cover covering at least a front area of the imaging device.

One application wherein the present invention particularly exhibits the usefulness is an arc welding robot. In this case, the industrial robot or the welding robot has an inspecting section for inspecting the result of the welding operation by an image obtained from the imaging device.

BRIEF DESCRIPTION OF THE DRAWINGS

The above and other objects, features and advantages of the present invention will be made more apparent, from the following description of the preferred embodiments thereof, with reference to the accompanying drawings, wherein.

DETAILED DESCRIPTION OF THE INVENTION

Figure 1:
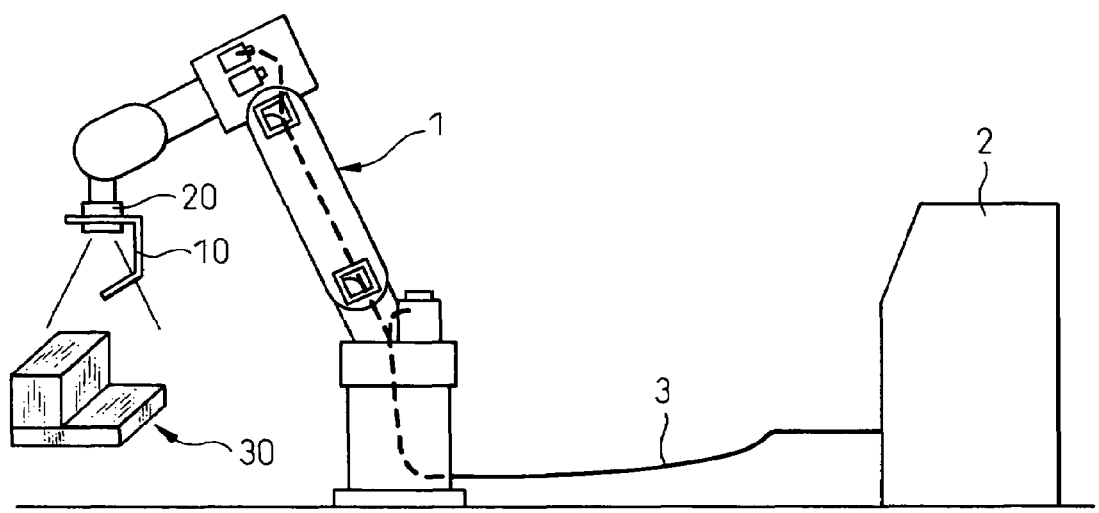
FIG. 1 illustrates a total structure of a robot system according to one embodiment of the present invention.

The present invention will be described below based on the preferred embodiments with reference to FIGS. 1 to 8. FIG. 1 illustrates a total structure of a robot system according to one embodiment of the present invention. In this drawing, reference numeral 1 denotes a robot according to this embodiment. The robot 1 is connected to a robot control device 2 via a cable 3. To a distal end of an arm of the robot 1, one of various end-effectors such as a working tool 10 and an imaging device 20 for the visual sensor are mounted. The working tool 10 is, for example, an arc welding torch (conveniently referred to as a torch) for carrying out the corner welding on a workpiece 30 having, for example, elements 31 and 32.

The robot control device 2 may be of a conventional type, including CPU, a memory, a teaching operation panel (not shown), a display (not shown) and/or an interface with a welding power source, a welding wire delivery device or others. The robot control device 2 may have software necessary for the manual operation of the robot 1 (jog feed), the operation for regenerating the operational program, the teaching of the operational program by a playback system, the correction of the operational program or other operations.

The imaging device 20 is, for example, a digital CCD camera forming a visual sensor together with an image processing device and a monitor display (not shown) in a well-known manner, and attached so that part of the working tool 10 comes into a visual field (details of the attachment structure will be described later). A detection signal (an image signal) output from the imaging device 20 may be used when the operational program is newly formed, when the working position is to be detected during the correction, or when the welding condition is inspected during and/or after the welding.

The control of the imaging device 20 and the operation of the image processing device may be carried by the robot control device 2 or by a separate personal computer. In this regard, the correction of the operational program may be carried out by adopting a method for correcting the teaching point at a higher accuracy while directly observing the working tool 10 and the working target position as described in detail in the specification and the drawings of Japanese Patent Application No. 2003-152845 incorporated herein by reference, because the imaging device 20 is attached so that part of the working tool 10 comes into the visual field.

Leads forming the cable 3 (see FIG. 5 and the explanation thereof given later) may be used for supplying electric power and transmitting the control signal to the imaging device 20 as well as for receiving; i.e., inputting; the detection signal (image signal) obtained from the imaging device to the image processing device. Alternatively, radio-communication means may be used for the transmission/reception (or solely the transmission in some cases) of the signal (see FIG. 6 and the explanation thereof described later).

Figure 2:
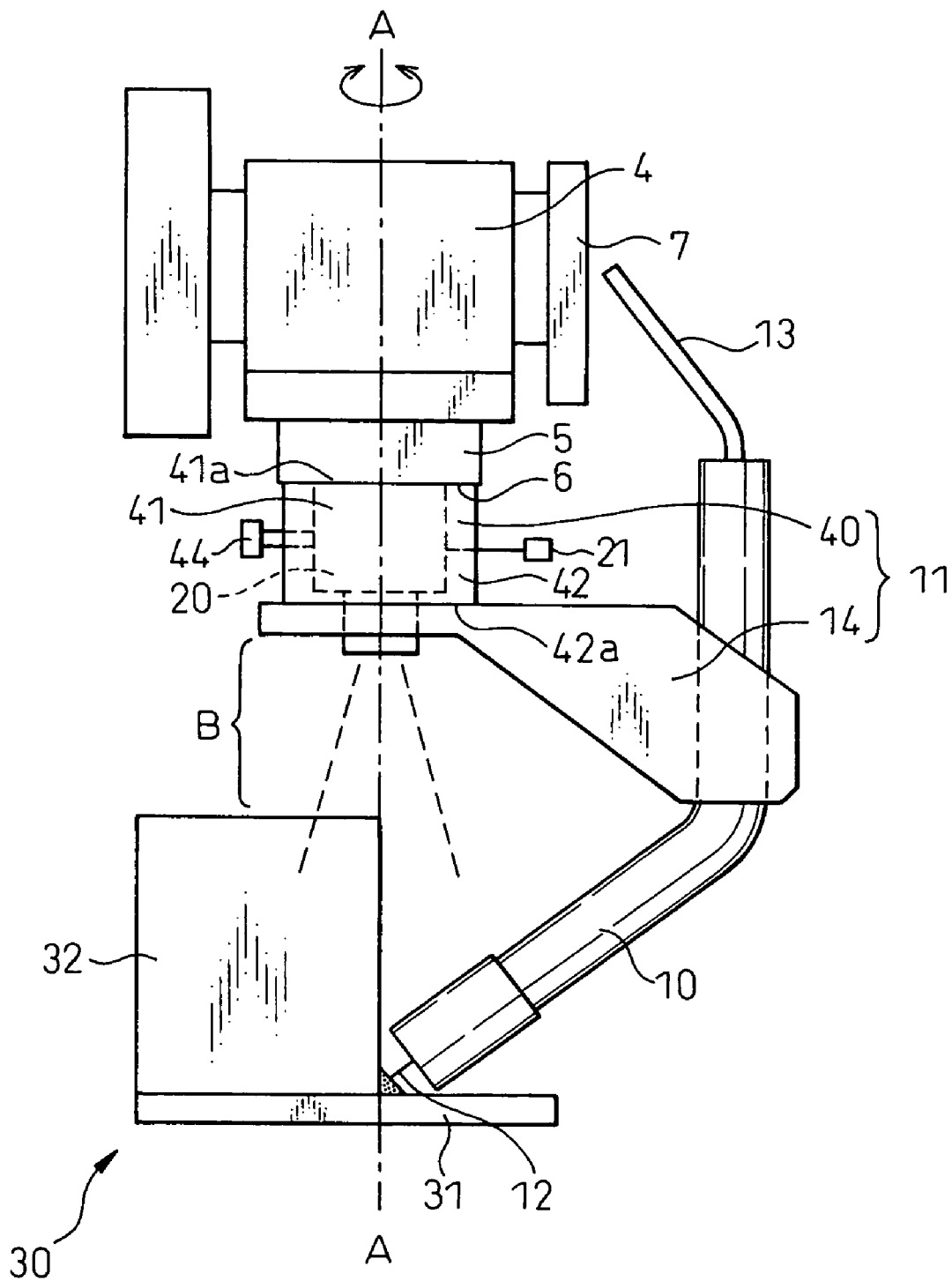
FIG. 2 is a side view of a structure for supporting an imaging device according to the embodiment of the present invention.

Then, a summary of the attachment structure for the working tool 10 and the imaging device 20 for the visual sensor will be described together with items relating thereto, with reference to FIGS. 2 to 4. First, FIG. 2 is a side view of a sensor supporting structure employed in an embodiment of the present invention for illustrating how to avoid the interference occurring between the imaging device and the workpiece. With reference to this drawing, a wrist flange 5 is provided at a distal end of a robot wrist 4 supported by a robot arm 7. A wrist flange surface 6 is formed at a distal end of the wrist flange 5 on which is attached an end effector supporting mechanism 11, more specifically, a container-shaped adaptor 40 of the end effector supporting mechanism 11.

The adaptor 40 has a first attachment section 41 on the side near the wrist flange 5 (or the bottom of the container) provided with a generally flat first attachment surface 41a to be attached to the wrist flange surface 6, and a second attachment section 42 provided with a generally flat second attachment surface 42a substantially parallel to the wrist flange surface at a position apart from the first attachment section 41 by a predetermined distance along a rotary center axis A-A of the wrist flange 5. The first attachment surface 41a is used for attaching the adaptor 40 to the wrist flange 5, wherein suitable well-known means (such as adhesive or screws) may be used for coupling the both with each other. The coupling may be either detachable or not.

The second attachment surface 42a is used for attaching the end effector holding member or a tool holding member 14 provided in the end effector supporting mechanism 11 thereon, so that a torch 10 is held. The second attachment surface 42a may be coupled to the tool holding member 14 by suitable well-known means (such as adhesive or screws). This coupling may also be either detachable or not. Accordingly, the tool holding member 14 is not directly attached to the wrist flange as in the prior art, but via the adaptor disposed between the tool holding member 14 and the wrist flange 5. Further, in one modification of the latter case, the tool holding member 14 and the adaptor 40 may be formed as an integral structure. In such a case, the second attachment section 42 and the attachment surface 42a are eliminated.

As shown in FIG. 2, the attachment position/posture of the torch 10 is inclined relative to the rotary center axis A-A of the wrist flange so that the posture of the torch 10 is variable in accordance with the rotation of the wrist flange about the rotary center axis, and a distal end of the welding wire 12 is located generally on the rotary center axis of the wrist flange during the welding. Accordingly, a center line of the visual field (an optical axis of a lens) of the imaging device 20 preferably coincides with the rotary center axis A-A of the wrist flange, as shown in the drawing, in order to bring the working position into the visual field. In this regard, reference numeral 13 denotes a torch cable for supplying the welding wire 12 and assist gas to the torch 10.

The imaging device 20 is at least partially accommodated in the interior of the container-shaped adaptor 40 so that a center of gravity thereof is positioned between the first attachment section 41 and the second attachment section 42. In this regard, when the second attachment section 42 is eliminated to make the tool holding member 14 to be integral with the adaptor 40, the above-mentioned result that the center of gravity of the imaging device 20 is positioned between the first attachment section and the second attachment section is obtainable by positioning the center of gravity of the imaging device 20 at a position within the adaptor 40. Also, a supporting manner of the imaging device 20 and a detailed structure relating to the adaptor 40 will be described later.

As described above, it is possible to solve the above-mentioned drawbacks (see FIG. 1 and the explanation thereof) by offsetting the imaging device 20 against the tool holding member 14 or the tool (in this case, the torch) 10 along the rotary center axis A-A of the wrist flange 5. For example, when corners of joint elements 31 and 32 are welded together under the same condition as described above, it is possible to easily provide a gap (see mark B) between a distal end of the imaging device 20 and a top of the joint element 32.

As is apparent, as a sufficient distance is easily obtained between a working position at which the working tool operates and the imaging device for detecting the working position by the above-mentioned structure, interference of the workpiece with the imaging device hardly occurs, which has often occurred in a case wherein the working tool must enter a narrow space. In other words, no interference area exists in the periphery of the working tool, especially in the vicinity of the distal end thereof (which is close to or in contact with the working position). According to such characteristic, the teaching operation and the correcting operation of the operational program are facilitated.

Figure 3A:
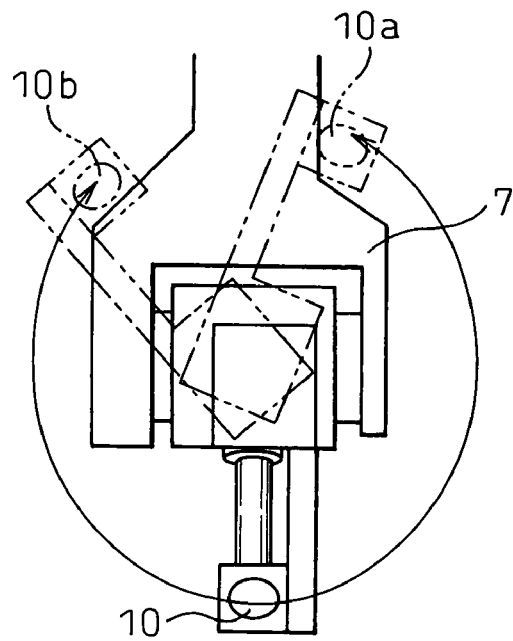
FIGS. 3a and 3b are a plan view and a side view, respectively, of the sensor supporting structure shown in FIG. 2, for explaining how to avoid the interference which may occur between the working tool and the robot body, and illustrating three rotational postures about a rotary center axis of a wrist flange.
Figure 3B:
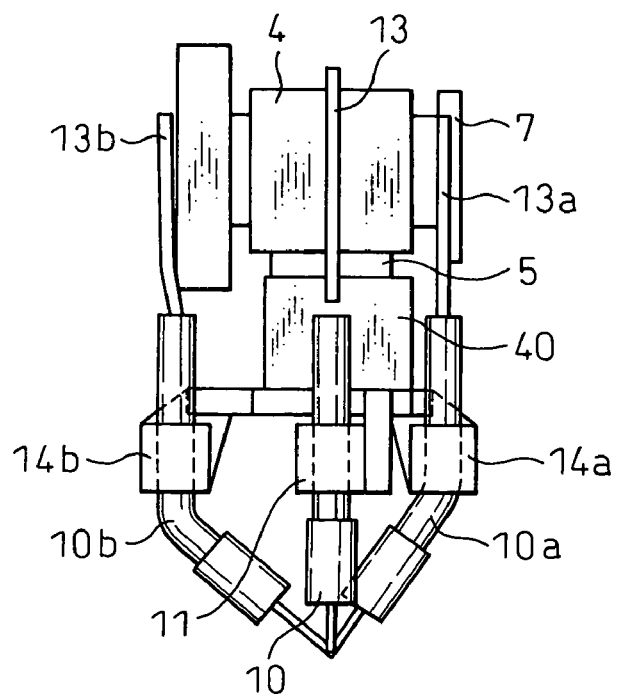

Further, by the above-mentioned structure, the interference between the welding torch and the robot body becomes less in comparison with the conventional structure. This will be explained with reference to FIGS. 3*a* and 3*b*. FIGS. 3*a* and 3*b* are a plan view and a side view, respectively, as seen from a side of the robot wrist 4 and illustrate the positional relationship of various members in three rotational postures about the rotary center axis A-A of the wrist flange.

As illustrated, when the robot rotates about the rotary center axis A-A of the wrist flange so as to change the posture of the torch 10, the distance between a proximal end of the torch 10 (closer to the torch cable 13) and the robot arm 7 supporting the robot wrist 4 varies. Even if the torch located at a position indicated by 10 rotates nearly equal to 180 degrees to occupy a position indicated by 10*a* or 10*b*, no collision (interference) occurs as there is a sufficient space between part of the torch (especially on the proximal end side) and the robot arm 7. In this regard, 14*a* and 13*a* denote positions of the torch holding member 14 and the torch cable 13, respectively, when the torch occupies the position indicated by 10*a*. Similarly, 14*b* and 13*b* denote positions of the torch holding member 14 and the torch cable 13, respectively, when the torch occupies the position indicated by 10*b*.

Next, the advantages will be described, below and with reference to FIG. 4, obtained by causing at least part of working tool 10 (usually a distal end thereof) to come into the visual field of the imaging device 20 (note that the imaging device need not be detached because there is no risk of interference) when the working tool (torch) 10 is in contact with or closer to the working position, for example, for the purpose of correcting the operational program in application of arc welding such as this embodiment.

Figure 4:
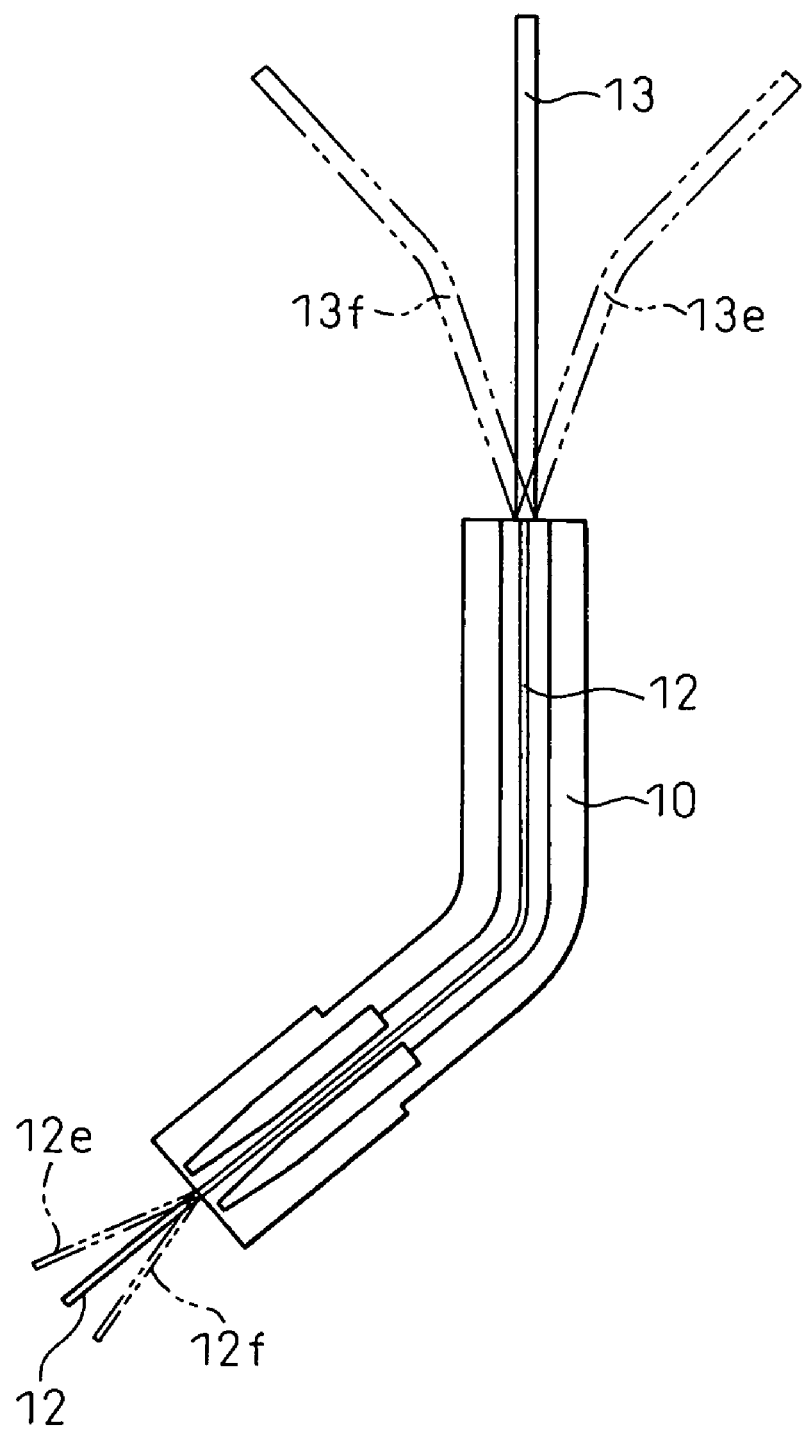
FIG. 4 illustrates the behavior of a welding wire relating to the change of torch posture.

As shown in FIG. 4, the welding wire 12 passes through the interior of the torch 10 and the welding operation is carried out by arc generated due to potential difference between the welding wire 12 and the workpiece. Generally speaking, the welding wire 12 is low in rigidity and liable to permanently curve. Accordingly, when the posture of the torch 10 varies in accordance with the movement of the robot, the torch cable 13 oscillates, for example, as shown by 13*e* and 13*f*, while the distal end of the welding wire 12 moves as shown by 12*e* and 12*f*.

If the distal end of the working tool 10 is visible by the imaging device 20 as in this embodiment, it is possible to carry out the teaching operation or the correction of the program while taking the positional deviation of the welding wire 12 into account. That is, it is possible to carry out the teaching operation of the correction of the program so that the distal end of the welding wire coincides with a desired working point. Also, since an image of a portion to be welded is visible by tracing the workpiece prior to carrying out the welding operation, while the torch and the imaging device actually used for the welding are mounted, it is possible to confirm whether or not a welding joint is normal. Moreover, it is possible to obtain an image while tracing the workpiece after the welding and to easily inspect whether or not the welded result is normal by using a suitable inspecting section 21 as shown in FIG. 2.

Figure 5:
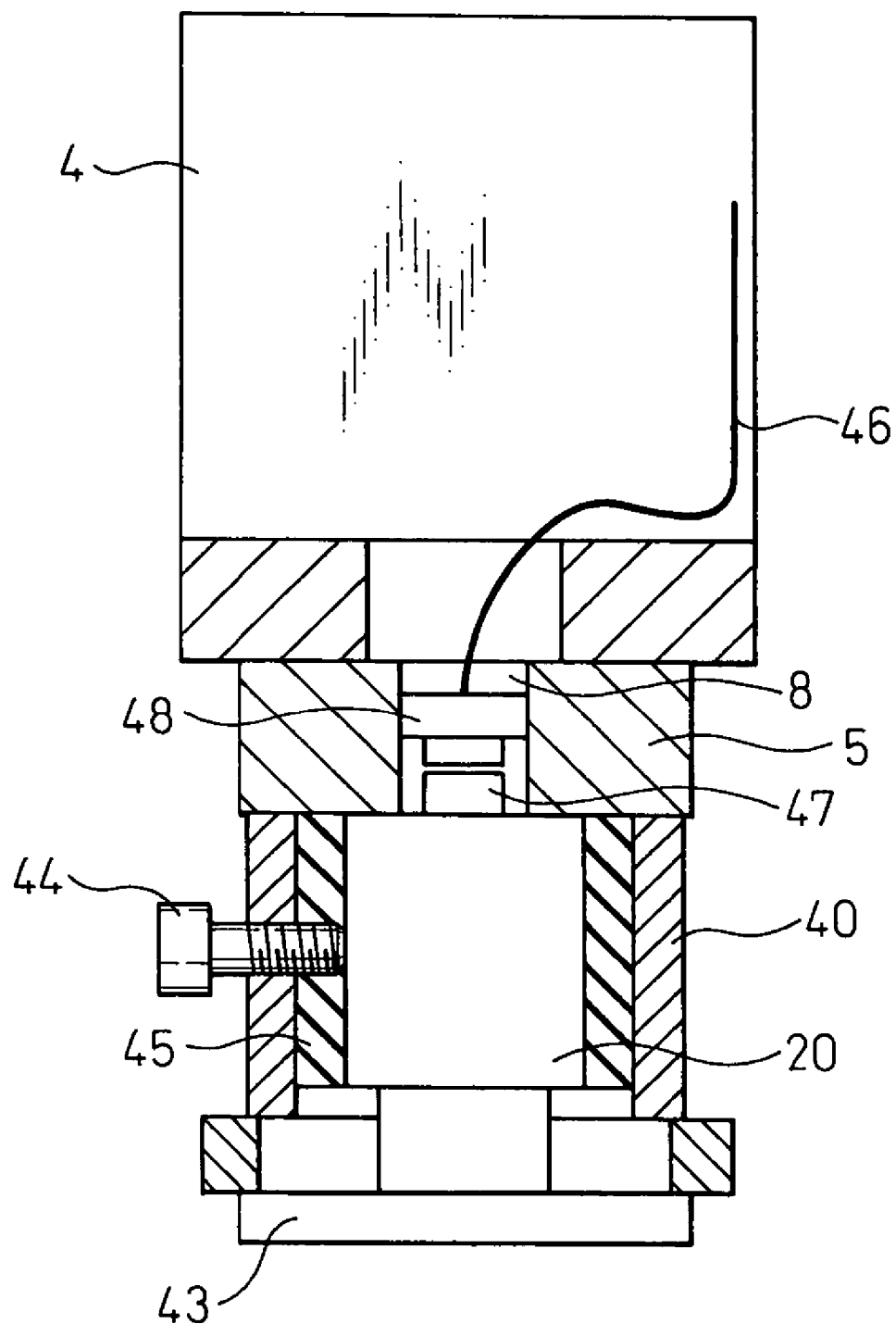
FIG. 5 illustrates a structure for holding an imaging device according to the embodiment of the present invention.

Next, a detail of an attachment structure for the imaging device of the visual sensor and modifications thereof will be explained sequentially with reference to FIGS. 5 to 8. First, FIG. 5 illustrates one embodiment of the attachment structure for the imaging device (camera) for the visual sensor. As shown in this drawing, the imaging device 20 is accommodated in the container-shaped adaptor 40. The imaging device is adapted to be reproducibly fixed to the adaptor 40, even if it is detached therefrom, by holding means such as an abutment screw 44. The abutment screw 44 is adapted to pass through a (threaded) hole of a member forming a lateral wall of the adaptor 40 and a heat-insulation member 45 attached to an inner wall thereof and abut to the imaging device 20. By rotating the abutment screw 44 opposite to the attachment rotation, the imaging device 20 is detachable. In this regard, the heat-insulation member 45 may be used as a fitting member between the adaptor 40 and the imaging device 20.

Positions and postures of the imaging device 20 are preferably reproducible when it is detached and then attached. For this purpose, various well-known means may be used, such as a magnet or a fitting pin. Connectors are provided in a rear portion (on a side of the wrist flange 5) of the imaging device 20, for supplying electric power and transmitting signals. The connector on the imaging device side is indicated by 47, and the connector on the wrist flange side is indicated by 48.

The imaging device side connector 47 is disposed in a lower half section in a through-hole 8 provided in the wrist flange 5, and electrically connected to the wrist flange side connector 48 by pushing the latter into the through-hole 8. If the connector 48 is withdrawn from the through-hole, the electric connection with the connector 47 is released. A cable (a distal branched portion of the cable 3 shown in FIG. 1) for supplying electric power and transmitting signals is incorporated in the robot arm, and a hollow portion is provided in the robot wrist 4, through which the cable (formed of leads 46) is connected to the wrist flange side connector 48.

By adopting such a wiring structure, it is possible to complete the electric connection between the imaging device and the visual sensor controller without newly providing a cable for the imaging device 20 in the vicinity of the robot arm.

In other words, the cable is automatically connectable to the imaging device 20 by mounting the imaging device 20 to the predetermined position. Further, it is also possible to provide a heat-insulating protective cover (a window member) 43 in front of the imaging device in a detachable manner by using suitable detachment mechanism (for example, a screw mechanism). According to this protective cover 43, heat generated during the welding operation is prevented from being directly transmitted to a front surface of the imaging device 20. Thereby, even if the welding operation continues without actually detaching the imaging device 20, it is possible to prevent the imaging device 20 from the failure or the abnormality thereof without detaching the same from the robot. Of course, the heat-insulation member 45 interposed between the adaptor 40 and the imaging device 20 also contributes to avoid the failure or the abnormality thereof due to heat. Further, the protective cover 43 and the heat-insulation member 45 have a function for mechanically protecting the imaging device 20 even if there is interference, and the protective cover 43 is effective for avoiding the direct adhesion of flies generated during the welding operation with a lens of the imaging device.

The protective cover 43 may be made of either transparent material or opaque material. In the latter case, there is no problem even in the teaching operation if it is detached. Also, when the protective cover 43 is made of transparent material, a clearer image is obtainable if it is detached the camera during the teaching operation. In either case, as the imaging device 20 itself is not necessarily detached, the operation is very convenient.

Figure 6:
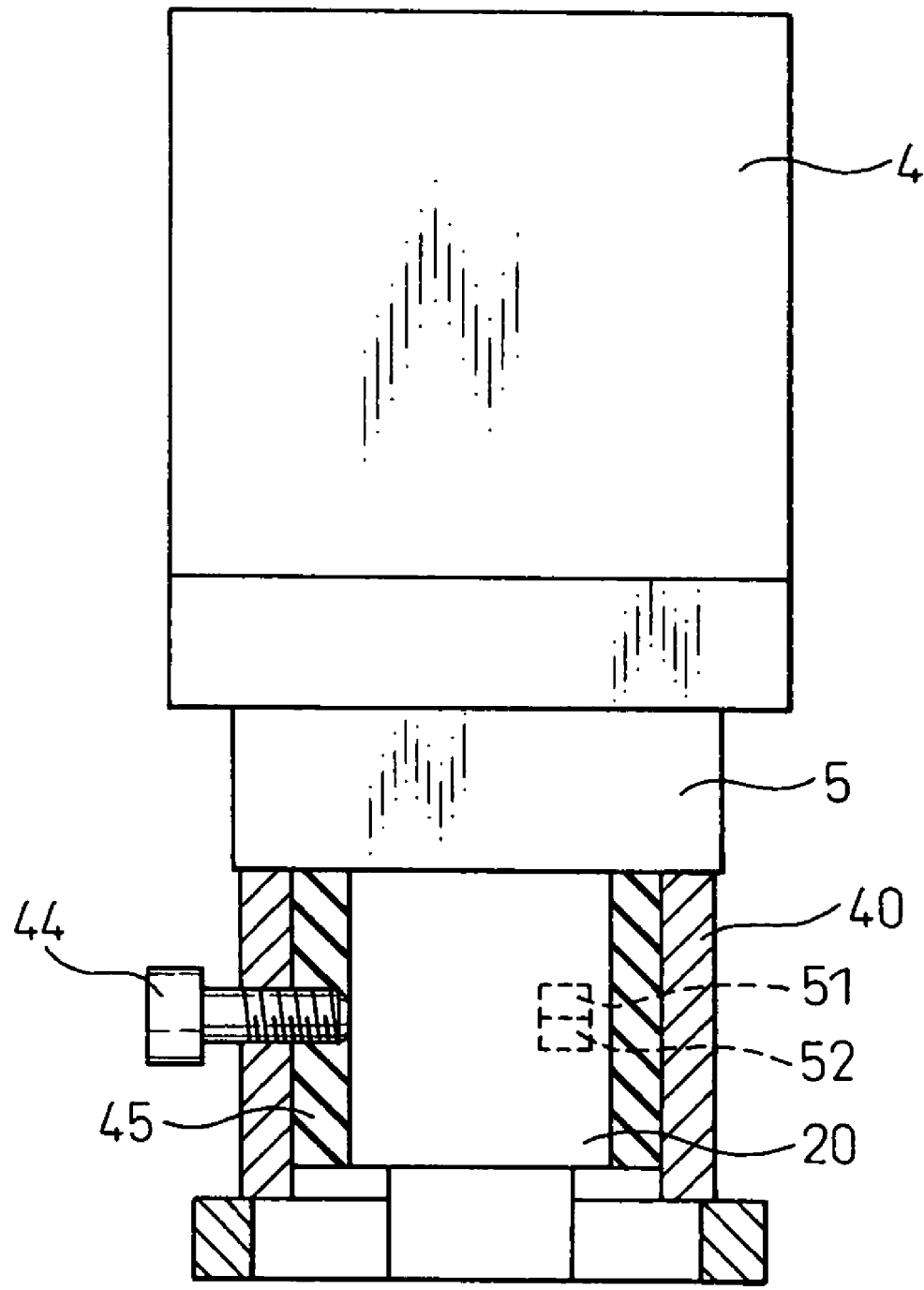
FIG. 6 illustrates a first modification of the embodiment shown in FIG. 5, wherein a radio-communication means is provided for the imaging device.

FIG. 6 illustrates a detail of a first modification of the above-mentioned embodiment, wherein radio-communication means is mounted to the imaging device. In this modification, a radio-communication transmitting section 51 and a radio-communication receiving section 52 are provided so that an imaging command from a visual sensor controller (not shown) is received by the radio-communication receiving section 52 and a detection signal (an image signal) is transmitted by the radio-communication transmitting section 51 to the visual sensor controller (including an image processing section). In such a manner, when the radio-communication means is provided, a cable for signals to be transmitted in a radio-communication manner is unnecessary. Also, a power supplying cable is unnecessary, provided a battery is used. Since other structures and functions than those relating to the signal transmission are the same as the embodiment shown in FIG. 5, the description thereof will not be given.

If it is desired to further simplify the fixing of the imaging device, a well-known process for preliminarily correcting the position of the imaging device in the robot may be provided. That is, in a case of a camera fixed to an optional position in the vicinity of a lower surface of the robot wrist flange, as described in IEEE TRANSACTIONS ON ROBOTICS AND AUTOMATION (Vol. 5, No. 3, June 1989) "A New Technique for Fully Autonomous and Efficient 3D Robotics Hand/Eye Calibration", a series of programmed movements are sequentially carried out, and after the respective movement, the input of image, the extraction of characteristic coordinate and the external calibration of the camera are executed. Thereby, the positioning mechanism is unnecessary for accurately regenerating the attachment position/posture of the imaging device to simplify the attachment of the imaging device.

Figure 7:
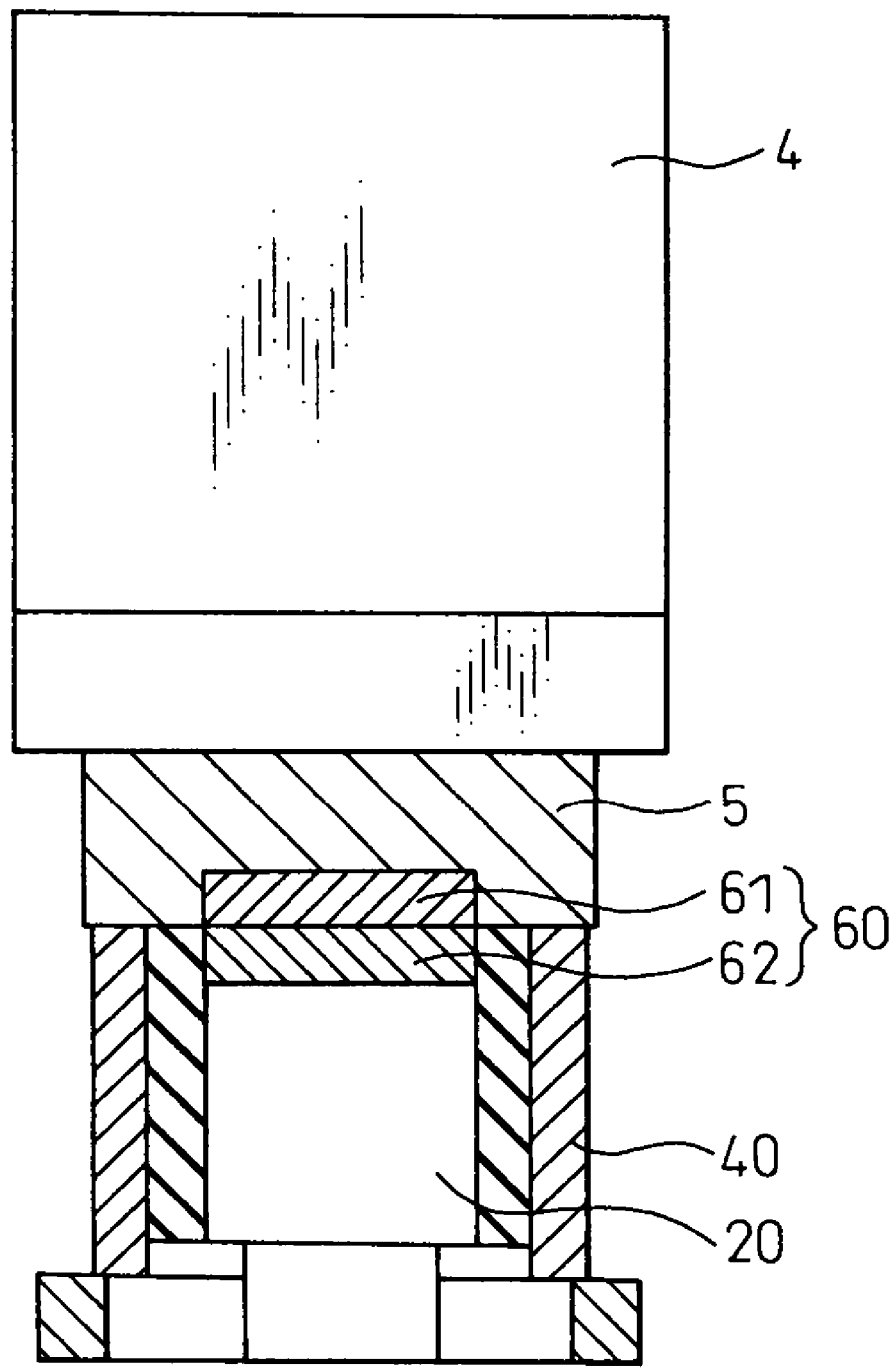
FIG. 7 illustrates a second modification of the embodiment shown in FIG. 5, wherein an electro-magnetic detaching mechanism is employed for the attachment and the detachment of the imaging device.
Figure 8:
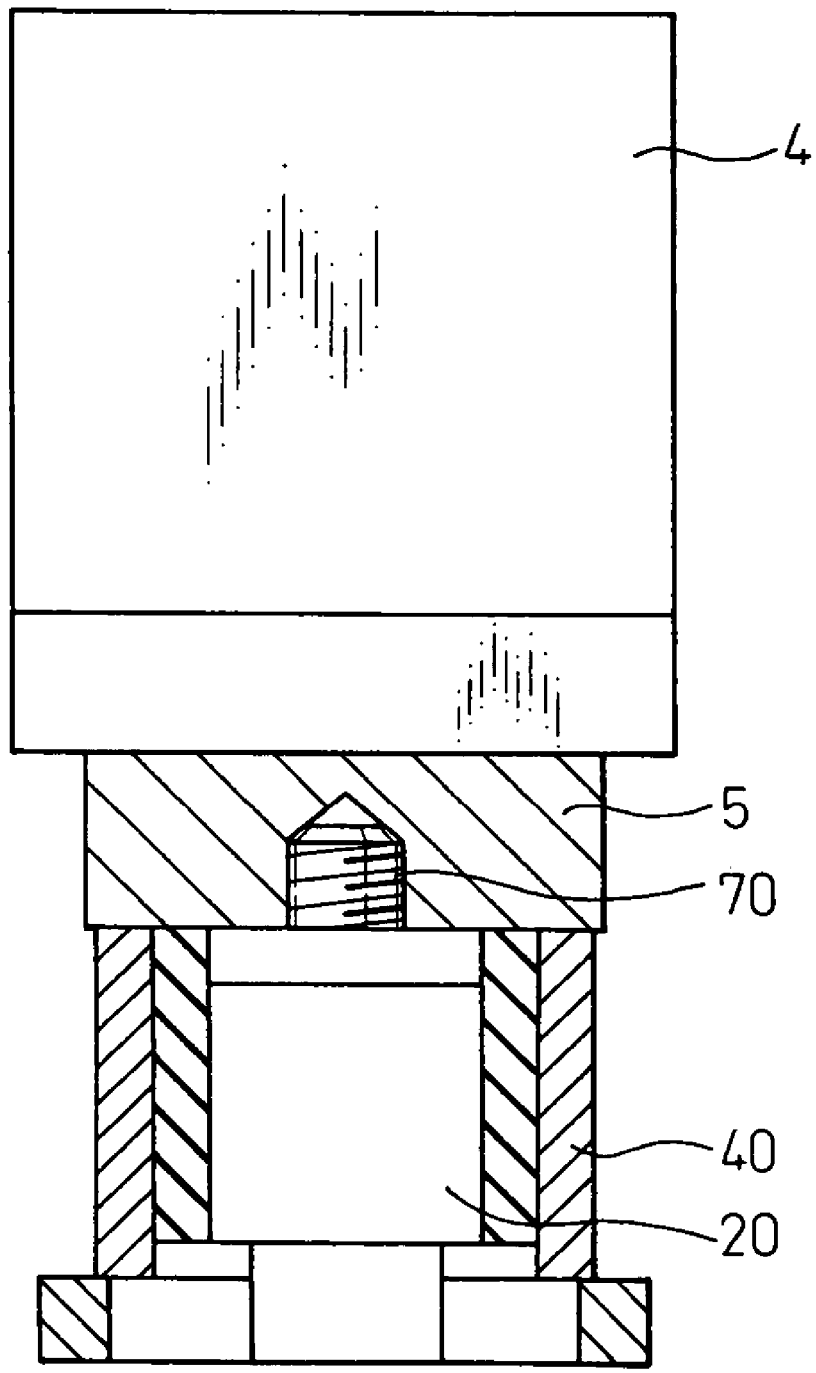
FIG. 8 illustrates a third modification of the embodiment shown in FIG. 5, wherein a screw type detaching mechanism is employed for the attachment and the detachment of the imaging device.

The attachment structure of the imaging device suitable for such a case are illustrated in FIGS. 7 and 8 as second and third modifications. FIG. 7 shows the second modification in which an electro-magnetic attachment/detachment mechanism is adopted for detachably holding the imaging device. As illustrated, the electro-magnetic attachment/detachment mechanism 60 for fixing the imaging device 20 includes an electromagnet 61 provided in the vicinity of a distal end of the wrist flange 5 and a magnetic substance 62 attached to the wrist flange side of the imaging device 20. When attaching the imaging device 20, the magnetic substance 62 is brought close to the electromagnet 61 which is then switched ON to fix the imaging device 20 by magnetic force. Thereafter, the imaging device 20 is used while maintaining the ON state of the electromagnet 61. When the imaging device 20 is detached, the electromagnet 61 is switched OFF to release the imaging device 20.

Instead of the electromagnet 61, a permanent magnet may be used. In this case, it is necessary that the magnetic force of the permanent magnet is sufficiently large to support a self weight of the imaging device 20 but can be overcome by a strong pulling force applied to the imaging device 20 by a hand or others to detach the magnetic substance 62 from the permanent magnet.

FIG. 8 illustrates the third modification in which a screw mechanism is adopted as a holding device for detachably holding the imaging device. A female-threaded hole is provided in the vicinity of a distal end of the wrist flange 5, and a screw 70 having a male thread is attached to the imaging device 20 for detachably fixing the imaging device to the wrist flange. When the imaging device 20 is attached, the screw 70 is screw-engaged with the wrist flange 5 side threaded hole. When the imaging device 20 is detached, the screw-engagement is released.

According to the present invention, the working tool holding member and the imaging device of the visual sensor for detecting the working position are fixed together at a distal end of the robot arm via the adaptor. The adaptor has two attachment sections apart from each other at a predetermined distance along the rotary center axis of the wrist flange. By using this distance, the imaging device is accommodated within the adaptor, while the positional relationship between the imaging device and the working tool held by the working tool holding member is such that both are offset from each other along the rotary center axis of the wrist flange. Thus, the present invention has the following effects.

(1) As the imaging device is apart from the working tool in relation to positions thereof along the rotary center axis of the wrist flange by the distance obtained by the adaptor, the imaging device hardly interferes with peripheral objects such as a workpiece, even if the working tool accesses a narrow space.

(2) As a distance between a distal end surface of the wrist flange and the working tool becomes longer due to the distance obtained by the adaptor, the interference hardly occurs between the robot arm and the working tool.

(3) As the imaging device is readily disposed on the rotary center axis of the robot wrist, it is possible that part of the working tool 10 easily comes into a visual field of the imaging device. Thereby, the teaching operation is effectively and accurately performable.

(4) The imaging device of the sensor is readily detachable. Also, the mounting position and posture can be assuredly regenerated. Accordingly, if teaching is necessary, the imaging device is easily mounted and carries out the correction of the teaching. Further, since the removal of the working tool is unnecessary at that time, there is no attachment error and the teaching operation can be carried out while observing the working tool itself through the imaging device.

(5) A particularly complicated or expensive mechanism or structure is unnecessary for obtaining the above-mentioned effects, which is economically advantageous.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. An industrial robot comprising:
a robot arm provided with a rotatable wrist flange;
an end-effector positioned at a predetermined working position by the robot arm;
an end-effector supporting mechanism attached to the wrist flange of the robot arm, for supporting the end-effector;
an imaging device accommodated in the end-effector supporting mechanism, for detecting the end-effector and the working position; and
a holding means for detachably holding the imaging device so that a center of gravity of the imaging device is located at a position within the end-effector supporting mechanism.

2. The industrial robot as set forth in claim 1, wherein the end-effector supporting mechanism comprises:
an adaptor for accommodating the imaging device in the interior thereof; and
an end-effector holding member attached to the adaptor, for holding the end-effector;
the adaptor comprising a first attachment section for attaching the adaptor to a wrist flange surface of the wrist flange and a second attachment section having an attachment surface generally parallel to the wrist flange surface at a position apart from the first attachment section by a predetermined distance along a rotary center axis of the wrist flange,
the imaging device being capable of being held so that a center of gravity of the imaging device is positioned between the first attachment section and the second attachment section.

3. The industrial robot as set forth in claim 1, wherein the end-effector supporting mechanism comprises:
an adaptor for accommodating the imaging device in the interior thereof; and
an end-effector holding member attached to the adaptor, for holding the end-effector;
the adaptor and the end-effector holding member are integral with each other, the imaging device is held so that a center of gravity of the imaging device is positioned within the interior of the adaptor.

4. The industrial robot as set forth in claim 1, wherein the imaging device and the end-effector are attachable so that a part of the end-effector comes into a visual field of the imaging device.

5. The industrial robot as set forth in claim 1, wherein the rotary center axis of the wrist flange and a center line of the visual field of the imaging device generally coincide with each other.

6. The industrial robot as set forth in claim 1, wherein the industrial robot comprises a mechanism capable of regenerating every time the same attachment position and posture of the imaging device relative to the end-effector supporting mechanism.

7. The industrial robot as set forth in claim 1, wherein a through-hole, for allowing a cable for the imaging device to pass therethrough, is arranged in the wrist flange.

8. The industrial robot as set forth in claim 7, wherein an imaging device side connector, for supplying electric power to the imaging device and transmitting signals, and a wrist flange side connector, electrically connectable to the imaging device side connector, are disposed in the through-hole.

9. The industrial robot as set forth in claim 1, wherein the imaging device comprises a radio-communication means.

10. The industrial robot as set forth in claim 1, wherein the industrial robot comprises a protective cover covering at least a front area of the imaging device.

11. The industrial robot as set forth in claim 1, wherein the industrial robot comprises an inspecting section for inspecting the result of the welding operation by an image obtained from the imaging device.

* * * * *